3,514,200
COLOR PRINTING LAMP SYSTEMS
John Kent Bowker, Marblehead, Mass., assignor to Itek Corporation, Lexington, Mass., a corporation of Delaware
Filed Nov. 7, 1967, Ser. No. 681,210
Int. Cl. G03b 27/00, 27/32, 27/52
U.S. Cl. 355—1                                       23 Claims

ABSTRACT OF THE DISCLOSURE

Optical apparatus including a condensing lens for collimating light from a primary source, a second condensing lens for focusing the collimated light on a first face of a light pipe, color filters movable in the collimated light to control the spectral intensity of the light, the light pipe having a pair of parallel walls for conducting the light diverging from the first face internally reflected in a first dimension and a pair of diverging walls for conducting the light diverging from the first face unreflected in a second dimension to a second face elongated in the second dimension, transition sections associated with the light pipe for providing within the light pipe a curved transition aperture which curves convexly, inwardly, of the second face creating a secondary curved, uncorrected, elongated, light source, and a condenser lens for creating from the secondary curved, uncorrected, elongated, light source, a tertiary, flat, corrected, elongated source of light diverging in the first dimension and for collimating the light from said tertiary light source in the second dimension.

CHARACTERIZATION OF INVENTION

Optical apparatus comprising a light pipe, means for concentrating light at a first face of the light pipe, the light pipe having first means for conducting the light diverging from the first face internally reflected in a first dimension and second means for conducting the light diverging from the first face unreflected in the second dimension to a second face elongated in the second dimension, correction means associated with the light pipe for providing within it a curved transition aperture which curves convexly inwardly of the second face creating a secondary curved, uncorrected, elongated, light source, and first condenser lens means for creating, from the secondary, curved, uncorrected, elongated light source, a tertiary, flat, corrected, elongated source of light diverging in the first dimension and for collimating the light from said tertiary light source in the second dimension.

BACKGROUND OF INVENTION

This invention relates to optical apparatus for producing an elongated flat field light source of uniform intensity from a concentrated light source and more particularly to such apparatus for producing a straight line light source of uniform spectral intensity for exposing film in a photographic printing machine.

Photographic printing machines of the type which use a narrow slit or strip of light to expose the print generally use a long-filament lamp whose light intensity output is not uniform for its entire length. Such lamps are difficult to focus properly using cylindrical optics and it is inefficient to do so with spherical optics. The result is usually a slit or strip of light of nonuniform intensity, with the slit being insufficiently flat or straight to correspond with the surface of the print to be exposed.

These problems are compounded where filters that interrupt or attenuate portions of the light which form the strip of light are used. In that case the portion of the strip corresponding to the portions of the light encountering the filter are of lower intensity than the parts of the strip corresponding to the portions of the light unaffected by the filters. Thus, while the intensity of the total light submitted to the strip may be as desired, it is but an average of the intensities of all the segments of the strip, some of which may be of greater intensity and some of which may be of lesser intensity than desired, resulting in a strip of light of non-uniform intensity.

The situation is further complicated when the filter or filters used to control the light are color filters used to control the spectral intensity of the light at the strip.

SUMMARY OF INVENTION

Thus it is desirable to have available optical apparatus for converting light from a concentrated light source into an elongated flat light source.

It is also desirable to provide such apparatus capable of producing an elongated flat rectangular light source of uniform intensity from light which has been interrupted or attenuated in whole or in part by filters which affect its intensity.

It is also desirable to provide such apparatus capable of producing an elongated flat rectangular light source of uniform spectral intensity.

It is also desirable to provide such apparatus for producing a light source of uniform intensity and adaptable for use in a photographic printer machine.

It is also desirable to provide such apparatus which is simple, compact, efficient, and inexpensive.

The invention is accomplished by optical apparatus including a light pipe, means for concentrating light at a first face of the light pipe, the light pipe having first means for conducting the light diverging from the first face internally reflected in a first dimension and second means for conducting the light diverging from the first face unreflected to a second face elongated in a second dimension, correction means associated with the light pipe for providing within the light pipe a curved transition aperture which curves convexly, inwardly of the second face creating a secondary curved, uncorrected, elongated, light source, and first condenser lens means for creating, from the secondary curved, uncorrected, elongated light source, a tertiary, flat, corrected, elongated source of diverging light in the first dimension and for collimating the light from said tertiary light source in the second dimension.

In specific embodiments there is featured second condenser lens means for focusing the light from the tertiary source of light in the first dimension to provide an elongated rectangular light source of uniform intensity.

Other embodiments include a primary light source and means for collimating light from the primary light source and directing it toward the means for concentrating light, and filter means, movable in the collimated light between the means for collimating and means for concentrating, to control the intensity of the light concentrated at the first face.

DISCLOSURE OF PREFERRED EMBODIMENT

Other objects, features, and advantages will appear from the following description of a preferred embodiment of the invention as shown in the attached drawings thereof, in which.

Figure 1:
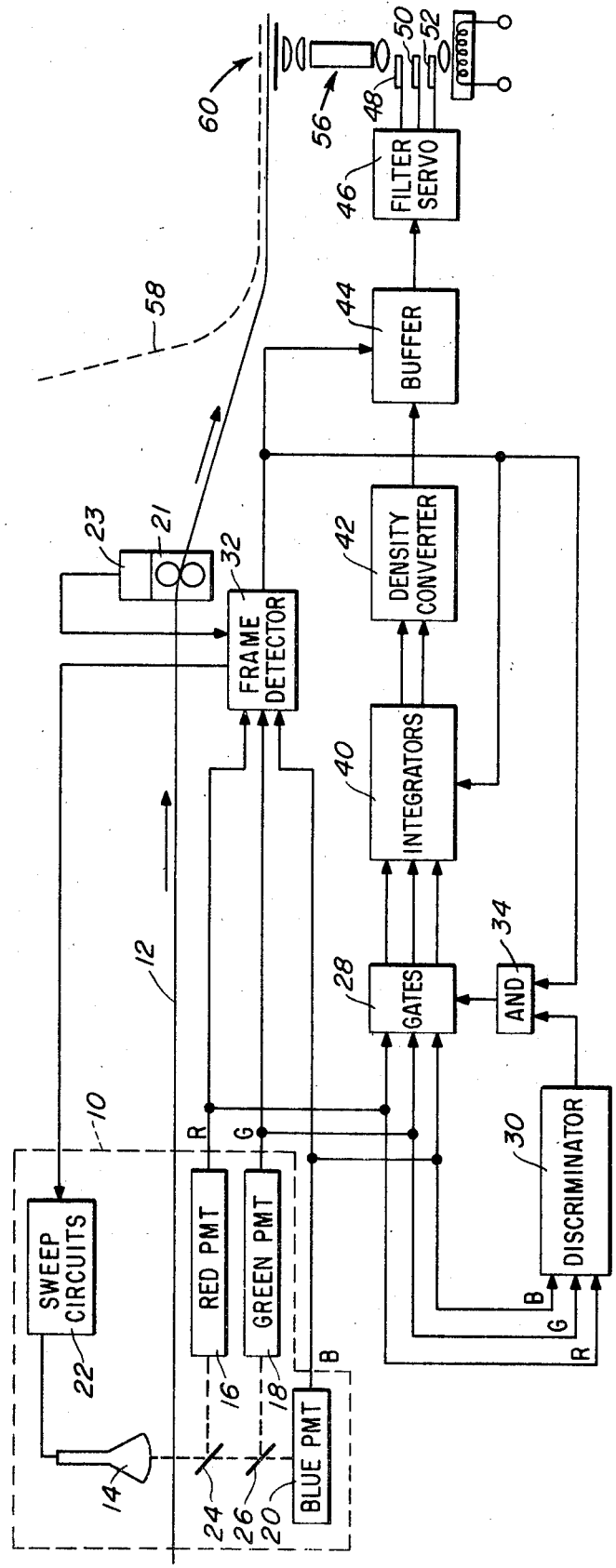
FIG. 1 is a diagram of a color printer machine using at its printing station optical apparatus according to this invention.

There is shown in FIG. 1 a color printer machine having a photometer section 10 for sensing the intensity of the colors present on frames of film 12 as it is moved past and between cathode ray tube scanner 14 and the red 16, green 18, and blue 20 photomultipliers by drive mechanism 21. Scanner 14 is driven by sweep circuits 22 at a frequency of 150 cycles per second to provide a line scan for successively illuminating strips of film 12 transverse to the direction of the film motion. The red portion of the light passing through film 12 is reflected to red photomultiplier 16 by dichroic mirror 24 which reflects red light and passes blue and green light. Dichroic mirror 26 reflects green light to green photomultiplier 18 and passes blue light to blue photomultiplier 20. The outputs of photomultipliers 16, 18, and 20 representing the intensity of the colors sensed by them are supplied to gates 28, discriminator 30 and frame detector 32.

Discriminator 30 continuously analyzes the incoming intensity signals to detect concentrations of a single color in a particular frame and provides a signal to AND circuit 34 as long as no such concentration is detected. Frame detector 32 analyzes the incoming intensity signals and provides a signal to AND circuit 34 indicating that a new frame of the film is being sensed when it distinguishes signals representative of a border portion of a frame. Frame detector 32 is synchronized with drive mechanism 21 by means of encoder 23. Concurrence of signals from discriminator 30 and frame detector 32 indicates that the information bearing portion of the frame between the borders is being sensed and that no concentration of a single color has been sensed. Under these conditions AND circuit 34 permits the red, green, and blue intensity signals to pass through gates 28 to integrators 40 where these signals are individually accumulated during the sensing of the entire information bearing portion of a frame. Since the signal from frame detector 32 also enables the information in integrators 40 to pass to density converter 42 and from gates 28 to integrator 40, the signal to gates 28 may be delayed with respect to the signal to integrators 40 to prevent mixing of the signals from adjacent frames, or a second set of integrators may be used so that one set is connected to gates 28 while the other is connected to density converter 42.

Density converter 42 logarithmically converts the analog red, green, and blue intensity signals to digital density signals and delivers them to buffer 44 which eventually delivers them to filter-servo 46. Cyan 48, magenta 50, and yellow 52 filters are interjected into the light path in optical apparatus 56 in accordance with the density signals supplied by buffer 44 to filter-servo 46 to properly adjust the light used to expose the print stock 58 through film 12 at printing station 60. Buffer 44 coordinates delivery of the density signals derived from a particular frame by photometer 10 with arrival of that frame at printing station 60 by delaying delivery until the number of frames detected by frame detector 32 since that frame was sensed is equal to the number of frame lengths a frame must travel between photometer 10 and printing station 60.

Figure 2:
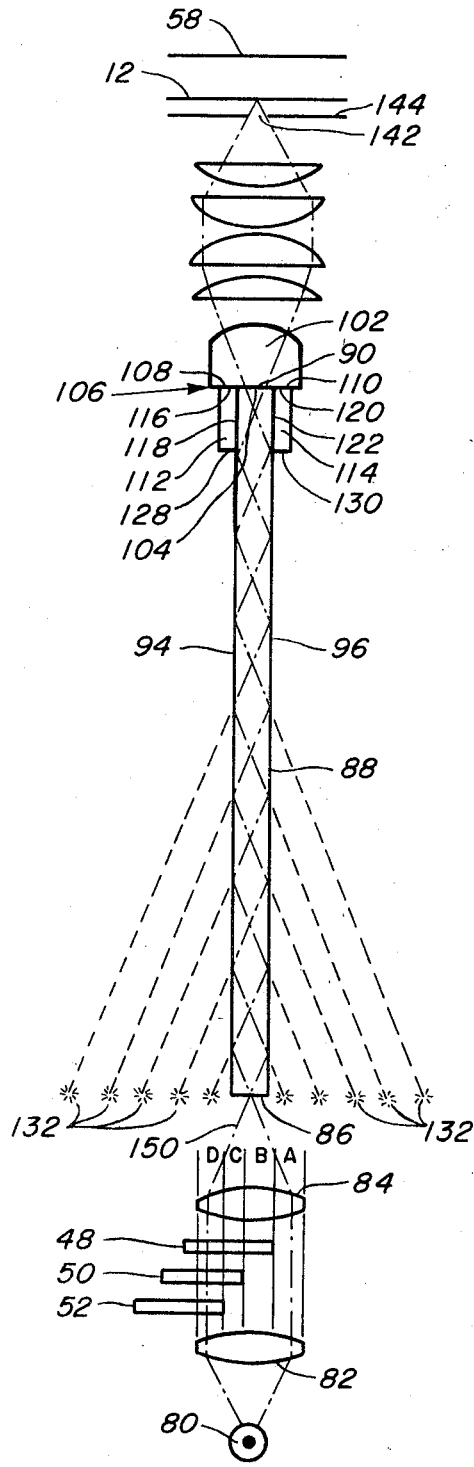
FIG. 2 is a detailed front view of optical apparatus according to this invention.
Figure 3:
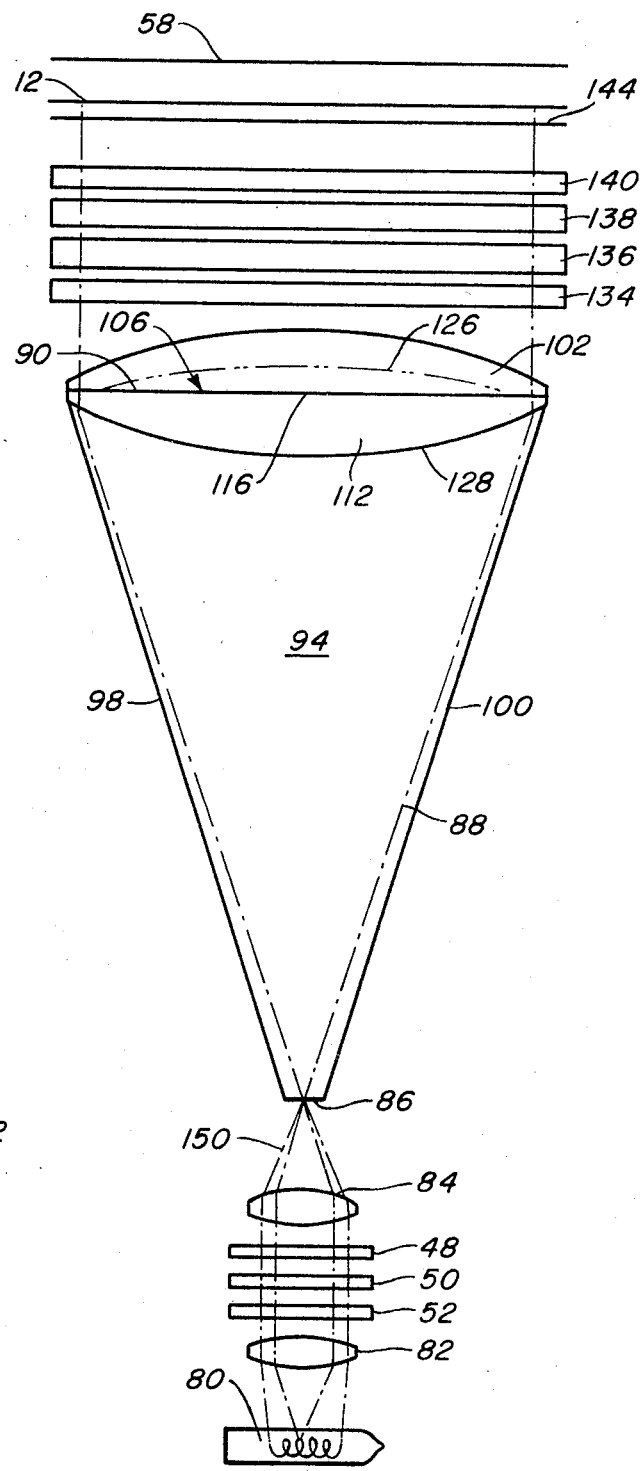
FIG. 3 is a side view of the apparatus shown in FIG. 2.

Optical apparatus 56 is shown in detail in FIGS. 2 and 3 where a quartz-iodine lamp 80 is used as the primary light source supplying light to condenser lens 82 which collimates and directs the light to a second condenser lens 84 that focuses or concentrates the light on a portion of small rectangular face 86 of light pipe 88. Cyan 48, magenta 50, and yellow 52 filters are introduced into the collimated light between lenses 82 and 84 to control the spectral intensity of the light concentrated on face 86.

The light is conducted through light pipe 88 to face 90 between a pair of parallel walls 94 and 96 which are narrow at face 86 and wide at face 90, and a pair of diverging walls 98 and 100, FIG. 3, which diverge towards face 90. As a result, faces 86 and 90 are equal in the thickness dimension but face 90 is substantially larger in the width dimension having the form of an elongated rectangle.

Slabbed lens 102, which is formed of a section of a plano-convex lens, has the central portion 104 of its planar surface 106 cemented to face 90, the two being coextensive in the width dimension but not in the thickness dimension. Lens 102 provides complete collimation of the light in the width dimension but no collimation of the light in the thickness dimension.

In the thickness dimension outer portions 108, 110 of surface 106 extend beyond walls 94 and 96 to engage curved transition sections 112, 114, respectively. Transition section 112 has its planar surface 116 cemented to portion 108 of surface 106 and its side wall 118 cemented to wall 94 of light pipe 88, while transition section 114 has its planar surface 120 cemented to portion 110 of surface 106 and its side wall 122 cemented to wall 96 of light pipe 88.

Were light pipe 88 without lens 102 and sections 112 and 114; a flat natural transition aperture would be present at face 90; transition aperture is defined as the area at the end of the light pipe from which the light rays depart the light pipe without encountering further internal reflection and it functions as a secondary light source. With the addition of lens 102 to collimate the light from light pipe 88, a composite lens is formed consisting of light pipe 88 and lens 102 which has its focus in the width dimension at face 86 and which creates a field of light beyond lens 102 curved as a result of the curvature in the apparent light source 126 of the transition aperture. The curved apparent light source 126 is a result of the additional thickness toward the center of lens 102 which is necessary for it to perform its collimating function. If uncorrected the curved field of light would eventually result in the production of a curved light source at film 12.

But the curvature is corrected by the addition of transition sections 112 and 114 on either side of light pipe 88, which enlarges the cross-section of the light pipe in the thickness dimension in a curved path along the convex surfaces 128, 130 of transition sections 112, 114, respectively, behind the natural transition aperture at face 90. This establishes a corrected transition aperture in that curved path which is symmetrically and oppositely curved relative to the curvature imparted by lens 102. The result is that lens 102 creates from the corrected, curved transition aperture a flat, corrected, elongated source of light at face 90.

Leaving lens 102 the light is fully collimated in the width dimension but is uncollimated in the thickness dimension. Cylindrical lenses 134 and 136 receive and collimate in the thickness dimension the light diverging from lens 102 and cylindrical lenses 138 and 140 focus that collimated light in the thickness dimension to provide an elongated rectangular source of light to illuminate the print stock 58 through film 12 at slit 142 in plate 144. In this embodiment the elongated rectangular light source provided at film 12 is approximately one-eighth inch thick by nine inches wide to correspond to slit 142. Four cylindrical lenses 134, 136, 138, and 140 are used rather than two to maximize the solid angle collected in the thickness dimension.

As the collimated light passes from lens 82 to lens 84, filters 48, 50, and 52, functioning as a subtractive color correction system, are introduced into the light to prevent all but the desired amounts of red, blue and green light from passing to lens 84. As a result, the light from lens 84 contains the total amounts of red, blue and green light desired but not uniformly distributed: the cone of light 150 between lens 84 and face 86, thus the concentration of light on face 86, contains the correct average amounts of the primary colors, but individual portions of the light may contain more or less of the colors.

This is apparent from FIG. 2 where portion A of the light, uninterrupted by any filter, contains all colors, portion B, interrupted by cyan 48 filter which eliminates red light, contains green and blue light, portion C, interrupted by cyan 48 and magneta 50 filters which eliminate red and green light, contains only blue light, and portion D, interrupted by cyan 48, magenta 50 and yellow 52 filters which eliminate red, green and blue light, contains no red, green or blue light. The total or average amounts of red, green, and blue light in portions A, B, C, and D may be correct, but of course the color content of each portion individually is not.

However, uniform intensity is obtained with this apparatus, for as the light travels to face 90 diverging within walls 98 and 100 in the width dimension, it is internally reflected by walls 94 and 96 many times to form a plurality of virtual images 132 of the light focused on face 86 as seen at the transition aperture. Because the light diverges in the width dimension, the light from each of the images appears along the entire elongated transition aperture. The focusing of the light from all of the images as it leaves the transition aperture by the cylindrical lenses 134, 136, 138, and 140 thoroughly mixes the light of all colors from all the virtual images 132 when they are brought to a common focus and provides an elongated rectangular source of light of the correct spectral intensity, which intensity is uniform over the whole of that elongated rectangular source.

It should be appreciated, then, that the invention provides optical apparatus for thoroughly mixing light of different intensities from a concentrated light source and produces an elongated light source having a desired average intensity which is uniform for the whole elongated light source.

Other embodiments will occur to those skilled in the art and are within the following claims.

What is claimed is:

1. Optical apparatus for converting a concentrated light source into an elongated flat light source comprising:
   a light pipe,
   means for concentrating light at a first face of said light pipe, said light pipe having first means for conducting said light diverging from said first face internally reflected in a first dimension and second means for conducting said light diverging from said first face unreflected to a second face elongated in a second dimension,
   correction means asociated with said light pipe for providing within said light pipe a curved transition aperture which curves convexly, inwardly of said second face creating a secondary curved, uncorrected, elongated, light source, and
   first condenser lens means for creating, from said secondary curved, uncorrected elongated light source, a tertiary flat, corrected, elongated source of light diverging in said first dimension and for collimating the light from said tertiary light source in said second dimension.

2. The apparatus of claim 1 further comprising second condenser lens means for focusing in said first dimension the light from said tertiary source of light to provide an elongated rectangular light source of uniform intensity.

3. The apparatus of claim 1 further comprising a primary light source and means for collimating light from said primary light source and directing it toward said means for concentrating light.

4. The apparatus of claim 3 further comprising filter means movable in the collimated light between said means for collimating and means for concentrating to control the intensity of the light concentrated at said first face.

5. The apparatus of claim 4 in which said filter means includes color filter means for controlling the spectral intensity of the light concentrated at said first face.

6. The apparatus of claim 5 in which said color filter means includes cyan, magenta and yellow filters for subtractively controllin gthe amounts of red, green, and blue light, respectively, in the light concentrated at said first face.

7. The apparatus of claim 1 in which the composite lens system including said light pipe and said first condenser lens means has a focus at said first face of said light pipe.

8. The apparatus of claim 1 in which said first light conducting means includes a pair of parallel walls extending between said faces and said second light conducting means includes a pair of diverging walls extending between said faces and diverging towards said second face.

9. The apparatus of claim 1 in which said first condenser lens means includes a plano-convex lens having its planar surface abutting and coextensive in said second dimension with said second face.

10. The apparatus of claim 9 in which said planar surface of said plano-convex lens extends beyond said second face in both directions of said first dimension and said correction means includes two plano-convex transition sections each having its planar portion abutting an extended surface of said plano-convex lens and having a side abutting said first means for conducting.

11. The apparatus of claim 2 in which said second condenser lens means includes a pair of cylindrical lenses.

12. The apparatus of claim 1 in which said means for concentrating includes an aspheric condensing lens.

13. The apparatus of claim 3 in which said means for collimating includes an aspheric collimating lens.

14. In a photographic printing machine optical apparatus for providing an elongated rectangular light source of uniform intensity comprising:
   a light pipe,
   means for concentrating light at a first face of said light pipe, said light pipe having first means for conducting said light diverging from said first face internally reflected in a first dimension and second means for conducting said light diverging from said first face unreflected to a second face elongated in a second dimension,
   correction means associated with said light pipe for providing within said light pipe a curved transition aperture which curves convexly, inwardly of said second face creating a secondary curved, uncorrected, elongated, light source,
   first condenser lens means for creating a tertiary, flat, corrected, elongated source of light diverging in said first dimension from said secondary curved, uncorrected, elongated light source and for collimating the light therefrom in said second dimension,
   second condenser lens means for focusing the light from said tertiary source of light in said first dimension to provide an elongated rectangular light source of uniform intensity,
   a primary light source and means for collimating light from said primary light source and directing it toward said means for concentrating light, and
   filter means movable in the collimated light between said means for collimating and means for concentrating to control the intensity of the light concentrated at said first face.

15. The apparatus of claim 14 in which said filter means includes color filter means for controlling the spectral intensity of the light concentrated at said first face.

16. The apparatus of claim 15 in which said color filter means includes cyan, magenta and yellow filters for subtractively controlling the amounts of red, green, and blue light, respectively, in the light concentrated at said first face.

17. The apparatus of claim 14 in which the composite lens system including said light pipe and said first condenser lens means has a focus at said first face of said light pipe.

18. The apparatus of claim 14 in which said first light conducting means includes a pair of parallel walls extending between said faces and said second light conducting means includes a pair of diverging walls extending between said faces and diverging towards said second face.

19. The apparatus of claim 14 in which said first condenser lens means includes a plano-convex lens having its planar surface abutting and coextensive in said second dimension with said second face.

20. The apparatus of claim 19 in which said planar surface of said plano-convex lens extends beyond said second face in both directions of said first dimension and said correction means includes two plano-convex transition sections each having its planar portion abutting an extended surface of said plano-convex lens and having a side abutting said first means for conducting.

21. The apparatus of claim 14 in which said second condenser lens means includes a pair of cylindrical lenses.

22. The apparatus of claim 14 in which said means for concentrating includes an aspheric condensing lens.

23. The apparatus of claim 14 in which said means for collimating includes an aspheric collimating lens.

References Cited

UNITED STATES PATENTS 3,060,805    10/1962    Brumley    355—1 X
3,327,287    6/1967    Ball et al.    355—1 X NORTON ANSHER, Primary Examiner R. A. WINTERCORN, Assistant Examiner U.S. Cl. X.R.

350—96; 355—32, 67, 71